United States Patent [19]

Gulack

[11] 4,416,633
[45] Nov. 22, 1983

[54] EDUCATIONAL AND RECREATIONAL MATHEMATICAL DEVICE IN THE FORM OF A BAND, RING OR CONCENTRIC RINGS

[76] Inventor: Max A. Gulack, 880 Fifth Ave., New York, N.Y. 10021

[21] Appl. No.: 935,183

[22] Filed: Aug. 18, 1978

[51] Int. Cl.$^3$ ............................................. G09B 19/02
[52] U.S. Cl. ..................................... 434/188; 40/329; 283/1 R; 63/1 R
[58] Field of Search ...................... 40/329; 35/30, 316, 35/70, 31 R; 283/1 R, 44; 434/188; 63/1 R

[56] References Cited

U.S. PATENT DOCUMENTS 2,749,555  6/1956  Oliveira ................................. 40/329
2,796,680  6/1957  Wittcoff ................................. 35/9 R

*Primary Examiner*—John W. Shepperd
*Attorney, Agent, or Firm*—Jordan and Hamburg

[57] ABSTRACT

An educational and recreational mathematical device comprises a ring or set of concentric rings or a band made endless or adapted to have ends thereof fastened to make them endless and a plurality of individual digits imprinted on the band or each ring at regularly spaced intervals. The digits when all read consecutively as a number constitute a quotient obtained by dividing a number constituted of (p-1)/n nines, in which P is a prime number greater than 5 and n is an integer at least 1, by P and adding to the left-hand end of said quotient any number of zeros necessary to increase the number of digits in the quotient to (p-1)/n or a specially chosen multiple of the quotient thus derived, n being so selected that (p-1)/n nines is the minimum number of nines divisible by P so that the quotient is an integral number.

5 Claims, 10 Drawing Figures

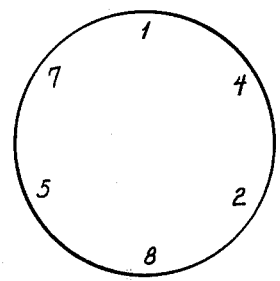
FIG. 1
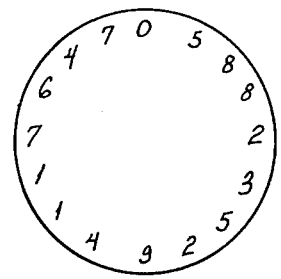
FIG. 2
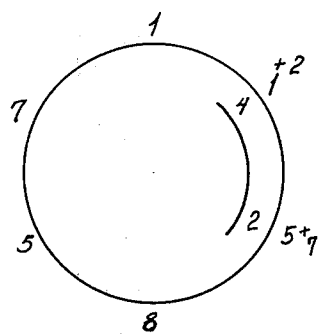
FIG. 3
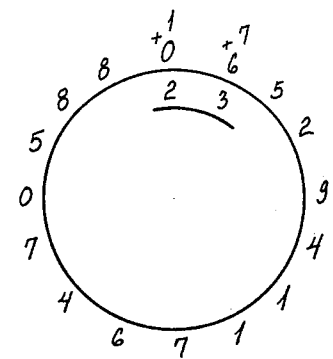
FIG. 4
FIG. 5
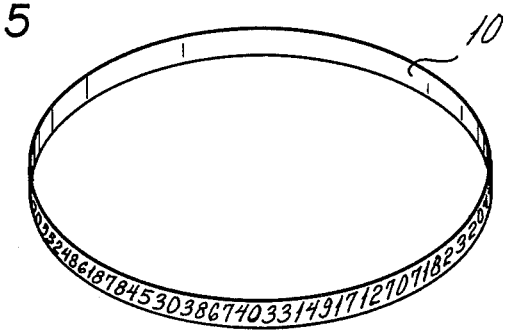

EDUCATIONAL AND RECREATIONAL MATHEMATICAL DEVICE IN THE FORM OF A BAND, RING OR CONCENTRIC RINGS

BACKGROUND OF THE INVENTION

This invention relates to educational and recreational devices.

It is an object of the invention to provide educational and recreational devices designed to produce a mathematical semblance of magic or to provide education regarding surprising and fascinating aspects of number theory when certain games are played therewith. The devices of the invention are based upon and are used to implement physically rarely noticed and unexplored, or perhaps heretofore unknown, arithmetic facts concerning all prime numbers larger than 5, herein designated as "P."

Other objects and advantages of the invention will be apparent from the following description thereof.

SUMMARY OF THE INVENTION

According to the invention, there is provided an educational and recreational mathematical device comprising a ring or set of concentric rings or a band made endless or adapted to have ends thereof fastened to make them endless and a plurality of individual digits imprinted on the band or each ring at regularly spaced intervals, the digits when all read consecutively as a number constituting a quotient obtained by dividing a number constituted of $(P-1)/n$ nines, in which P is a prime number greater than 5 and n is an integer at least 1, by P and adding to the left-hand end of said quotient any number of zeros necessary to increase the number of digits in the quotient to $(P-1)/n$ or a specially chosen multiple of the quotient thus derived, n being so selected that $(P-1)/n$ nines is the minimum number of nines divisible by P so that the quotient is an integral number. In the claims, the term "band" means band or ring.

BRIEF DESCRIPTION OF THE DRAWINGS

FIG. 1 is a diagram illustrating certain mathematical principles of the invention;

FIG. 2 is another diagram illustrating certain mathematical principles of the invention;

FIG. 3 is another diagram illustrating certain mathematical principles of the invention;

FIG. 4 is another diagram illustrating certain mathematical principles of the invention;

FIG. 5 is a perspective view of an endless band embodying the invention;

DETAILED DESCRIPTION

Figure 6:
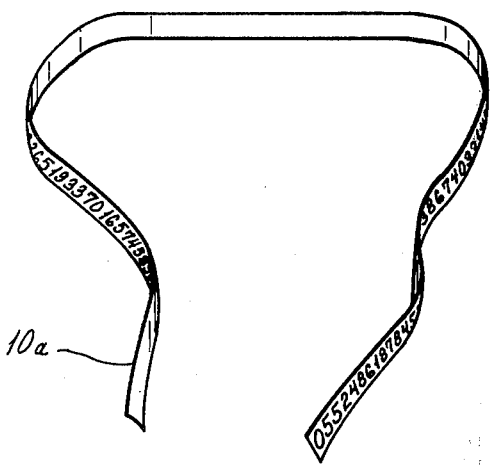
FIG. 6 is a perspective view of an apparel belt embodying the invention.

The invention will now be further described by reference to more specific details thereof.

A row of $P-1$ nines is always divisible by P to give a quotient Q which is an integral number.

Whenever a smaller number of nines is divisible by P to give an integral quotient Q, the number will always consist of some integral fractional part of $P-1$ nines, which may be designated as $(P-1)/n$, in which n is an integer greater than 1.

For example, if $P=7$, then 999,999 divided by 7 will yield the quotient Q of 142,857, but for the prime 13, only 6 nines (one half of $P-1$) will suffice to produce the integral quotient Q of 076,923. For the purpose of this analysis and implementation of the games and devices herein described, the initial zeros of any quotient Q will be preserved or accounted for. It will be found that the number of digits in the quotient Q will always be $P-1$ or some integral fraction of $P-1$. For example, when $P=13$, the number of digits in the quotient Q, including the initial zero, is $(P-1)/2$. In other words, $(P-1)/2$ is the minimum number of nines which when divided by P gives an integral quotient Q.

Whenever the number of digits of the quotient Q is the full $P-1$, always including any initial zeros, any multiple of the quotient Q containing the same number of digits will always be a "cyclic" variation of the quotient Q. This means that if the digits of the quotient Q were arranged clockwise on a circle, any multiple of the quotient could be read off the resulting "dial" in the same clockwise fashion. The quotients Q of primes (P) 7 and 17, for instance, will produce the dials illustrated in FIGS. 1 and 2, respectively. The quotients Q are 142857 and 0588235294117647, respectively, and can be read from the respective dials clockwise starting at the top, and any multiple of these quotients Q, not exceeding the original number of digits, can be read directly from the applicable dial in clockwise order. Even if the multiple has more than the original number of digits in any case, the seeming magic of the "cyclic" quality of these quotients Q will still hold. Thus, for example, multiplying these exemplary quotients Q by 111 will produce additional digits. Each of these multiples may be wrapped around a dial spaced for its original number of digits, any overlapping digits are added up and in each case there is obtained a cyclic array of the original quotient Q. In FIGS. 3 and 4, these operations are illustrated for the quotients Q derived from the prime numbers $P=7$ and $P=17$, respectively. Thus, in FIG. 3, the multiple is 15857127,

```
starting with        15
and ending with      27  overlapping,
if added up,    =    42.
```

42 is thus included in the resulting cyclic array, which in the clockwise direction beginning with 1 reads as 142857, i.e., the original quotient Q. Similarly, in FIG. 4, the multiple is 065294117647058817,

```
starting with        06
and ending with      17  overlapping
if added up,    =    23.
```

23 is thus included in the resulting cyclic array, which in the clockwise direction beginning with 0 reads as 0588235294117647, i.e., the original quotient Q.

However, as stated above, Q may in some cases have only $(P-1)/n$ digits, in which n is an integer greater than 1. In all such cases there will always be n different basic multiples of Q (including Q itself, the "multiple" thereof being one) which have no cyclic relationship to each other, but any other multiples of Q will always be a cyclic variation of one of these basic multiples. For example, for P=13, n=2 and the basic multiples are Q=076923 and 2Q=153846. Each and every other multiple of Q will be a cyclic variation of one of these two basic multiples and will behave exactly as shown above. Thus 5Q is a cyclic variation of 2Q and 4Q is a cyclic variation of Q and so forth. Consider, for example, 19×Q=1461537. Here there is a surplus digit "1" at the left which should be added to the last digit as an overlapping digit, as if 1461537 were arranged in a circle according to the system hereinabove illustrated, whereby 461538, a cyclic variation of 2Q is obtained.

Another quality of Q and multiples thereof is utilized in rendering the devices and games of the present invention made possible by the arithmetic facts shown herein. It is found that if P is 2 digits, Q or any multiple of Q, or cyclic variation of Q or any multiple of any cyclic variation of Q, if reduced to the original number of digits as aforesaid, will never contain any sequence of any 2 digits more than once. Any pair of digits will be exclusive and immediately determine the whole cyclic sequence of digits in such number. If P is a 3-digit number, the same principle will apply to any sequence of 3 digits, and so forth.

There is still another quality of Q which proves useful. Whenever a number which is Q (or, in accordance with the general principles of the invention, any cyclic variation of Q or multiple of Q or multiple of any cyclic variation of Q if reduced to the original number of digits as aforesaid) contains an even number of digits (including any initial zeros), every digit in the first half of the number will always be 9 minus the corresponding digit in the second half of the number. This also means that if the two halves of the number added as separate numbers, the sum will consist solely of a series of nines. In a rare instance where Q has an odd number of digits, there will exist manipulations involving a cyclic variation of a multiple of Q whereby a number consisting soley of a series of nines will be obtained. For example, when P=41, and Q=02439, this latter rule is satisfied by a cyclic variation of 4Q. 4Q=09756 and 02439+97560=99999. Moreover, for each cyclic variation of any multiple of Q there will always be another multiple of Q which will furnish a cyclic variation the sum of which with the first mentioned cyclic variation will be a number consisting soley of a series of nines.

The various qualities of quotients Q derived as stated above are utilized for the devices and games according to the present invention.

Figure 7:
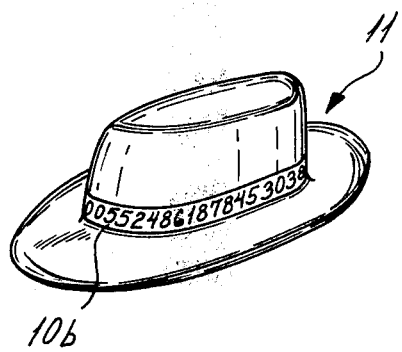
FIG. 7 is a perspective view of a hat having a hatband embodying the invention.
Figure 8:
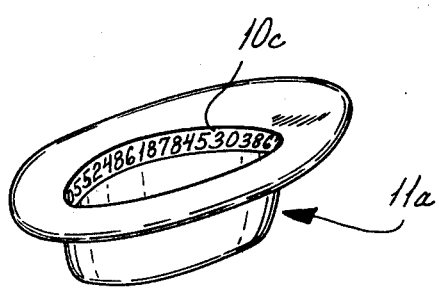
FIG. 8 is a perspective view of a hat having a sweatband embodying the invention.
Figure 9:
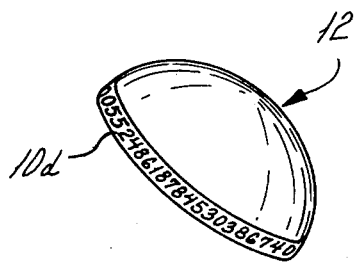
FIG. 9 is a perspective view of a skullcap embodying the invention.

In FIGS. 5 to 9 are illustrated specific devices according to the invention for making use of the aforementioned qualities of a quotient Q to provide education and entertainment. All are means in the form of a band for supporting a cyclical array of digits of Q. In FIG. 5, the band 10 is an endless paper, fabric or plastic loop. In FIG. 6, the band 10a is a tie belt, such as for a robe. In FIG. 7, the band 10b is a hatband of a hat 11. In FIG. 8, the band 10c is the sweatband of a hat 11a. In FIG. 9, the band 10d is the border of a skullcap 12. In connection with FIG. 9, it will, of course, be understood that the band 10d need not be a physically discrete band sewed onto the skullcap but may simply be a circumferential zone of the skullcap. Other devices may consist of necklaces, wedding rings, edges of round tables or other household or recreational devices or utensils or jewerly, or other artifacts.

For the exemplary embodiments illustrated in FIGS. 5 to 9, the 180 digit quotient Q derived from a line of 180 nines divided by the prime number 181 has been selected. That quotient Q is 005524861878453038674033149171270718232044198-
895027624309392265193370165745856353591 1602-
209944751381215469613259668508287292817 6795-
580110497237569060773480662983425414364 6408-
839779.

While not per se critical to the invention, this particular prime is chosen because the quotient Q of 180 digits (including 2 initial zeros) is long enough to make baffling and interesting games without being so long as to be onerous to print on physical objects. Its relationship to 18, which is deemed a magic and lucky number in Hebrew lore, gives it some added charm. The two Hebrew letters which are used to designate this number spell the word HAI, which means "life" in Hebrew and has become a traditinal design for lucky charms. HAYIM is the plural of HAI. I refer to a closed or endless band imprinted with this particular quotient Q as a "MAGIC RING OF HAYIM." Every multiple of this 180-digit number consisting of 180 digits is a cyclic variation of the original 180-digit number, as illustrated above with respect to other, similarly derived quotients Q. These digits, including the 2 initial zeros, are placed on a band, whose ends are joined or joinable to form a loop or ring, i.e., an endless band. This immediately yields 180 cyclic variations of the original number (quotient Q) by eliminating the original beginning and end, thus making the quotient Q an almost endless variety of smaller numbers, which could begin and end anywhere on the tape. The band could be used in the ways herein illustrated or along the circumference or periphery of any circular (including spherical) object sufficient in size to hold 180 legible digits. If accompanied by the explanatory text such as that given hereinbelow, it will have considerable entertainment value at the hands of its owner thus familarized with its qualities.

Of course, smaller sequences similarly devised would be equally entertaining. For example, a smaller prime basis may be used, such as 149, which would give a quotient Q of 148 digits, and a truly spectacular band would be obtained by using the prime 541 to produce an array of 540 digits. Particularly in the case of lengthy quotients Q, no pattern will be perceptible to the uninitiated. P−19 will yield eighteen digits symbolically interesting and suitable for smaller rigid ring.

Figure 10:
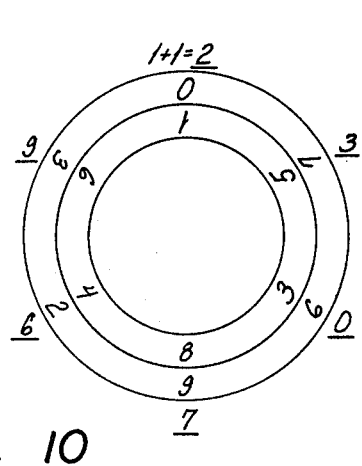
FIG. 10 is a plan view of two concentric rings embodying the invention.

The single-ring device is best suited for numbers in which Q consists of the full P−1 digits, so that all of its multiples will be cyclic variations of Q itself. However, when such multiples fall into several, but not too many different sequences—like when n=2 or 3 or 4, and Q has only (P−1/n digits, then a set of concetric rings, properly devised, will constitute another novel device. As shown above, for P=13 there are two 6-digit categories of multiples. Each category is placed on a separate ring, equally spaced for its 6 digits in clockwise order. The rings are flat and concentric—one easily rotated within the other—and placed on a slate or pad of paper to show six pairs of digits as shown in FIG. 10. Each pair is then added, starting at any point and proceeding counter-clockwise (like adding two 6-digit numbers from right to left), and the sum written down on the slate or pad clockwise along the outer ring. The process is continued until all pairs are added and a new 6-digit ring is formed. Any surplus digit resulting from adding up the last pair is simply carried over and added to the digit already entered at the start, which it will, of course, overlap—all in counterclock-wise order. In FIG. 10 the addition was started and finished at the top. Reading the result clockwise starting with "0" (lower right side) we get: 076923, which is the exact number on the outer ring. The 'magic' here is that nothing has happened to the outer ring—it remains unchanged even though the entire inner ring was completely added to it. Rotated into a different relative position the two rings might add up to the inner ring—in which case one might ask: "how is it that adding the outer ring has not changed the inner ring at all?" No matter what mutual position the two rings are placed in, or where the addition was started, the result is always one of the rings as if the other ring didn't even exist.

For P=31 and P=43 we will get two 15-digit and two 21-digit rings respectively, which will behave in exactly the same way as the two 6-digit rings illustrated, but will be more interesting because of the greater number of digits and variety of combinations. Still more interesting will be the use of P=53 which will yield four different 13-digit rings. Arranging them in the same concentric manner and adding all four digits at each point, the newly formed outer ring will always yield one of the four original rings, as if the three rings which were added to it didn't even exist.

When there are two basic sequences, as for P=13, still another "magic" device is possible. Both variations are placed on one ring by having their digits alternate. Each ring will have 12 digits and six different rings will be possible for P=13. The ultimate demonstration is as simple as it is baffling. The audience is invited to pick a combination of two or more rings and add up only alternate digits from any concentric line-up of the rings chosen. The result of any counter-clockwise addition, performed as stated above—no matter which of hundreds of alternatives is chosen—will always be a 6-digit cycle consisting of either 076923 or 153746. The same method can, of course, be used also for various other values of P, but for this particular device P=13 would appear most convenient, even though for P=43 (or even more) a set of wheels—as many as 21—turning on an axle, with 42 digits imprinted on the face of each rim, would constitute a truly spectacular set-up with spectators and players never being able to get away from the two originally indicated results consisting of but the two cyclic variations of Q for P=43. It must be borne in mind, however, that there is always a possibility of the ultimate result consisting solely of a series of nines—which is equally interesting.

An exemplary text to accompany a device according to the present invention may be as follows, this particular text being composed in terms of the 180-digit quotient Q but being readily revisable for other quotients Q.

Pick any number from 6 to 180 consecutive digits from the band and write them down horizontally in sequence to form a number. Then likewise pick another sequence of the same length and again write it down horizontally, either above or below the original sequence chosen. The larger number should be on top, so that the two numbers can most conveniently be either added or subtracted.

Now you may either add or subtract these numbers, then strike out the last three digits on the right and also the additional digit "1" on the left, if it occurs as a surplus digit in adding the numbers chosen. Thus, if you were to start with two 20-digit numbers and add them up or subtract the smaller one from the larger, you will wind up with 17 digits. If you will then go over the digits on the ring, you will always find these remaining 17 digits in the same sequence right on the band. The band will never let you down. Moreover you may again combine the result with another sequence from the band of equal length by addition or subtraction, then again drop the last 3 digits of the result and also any additional resulting first digit, and again you will find the remaining digits lined up somewhere on the band. You may also multiply any 6 to 180-digit sequence from the band or any result obtained from heretofore described previous operations by 2, 3 or 4 or even more, and again find the final result right on the band, always after dropping the last 3 digits and any resulting surplus digit.

There are only two exceptions. If you pick the same sequence twice and subtract one from the other, you will, of course, get a zero. Also, in a very rare case you may get all nines. Otherwise, this MAGIC RING OR HAYIM holds all resulting numbers within its 180 digits in their exact sequence of digits. The two original sequences which you may pick may even partially overlap, and the apparent magic of this RING will still work the same way—it will never let you down. Considering that there are thousands of possibilities in these various combinations and operations, this is quite baffling.

This series of 180 digits and simiarly derived numbers as stated above have some additional seemingly magic qualities:

If the endless band is a pliable material such as paper or fabric or plastic foil and is flattened in half anywhere so as to form two faces, with half the digits on each face seen from opposite directions, the sum of any two corresponding digits from the two respective faces, read left to right, will always equal 9.

Also, no three digits are ever repeated in the same sequence anywhere within the ring. This means that any sequence of digits in the ring is always fully determined by its first three consecutive digits.

These qualities may be used for two interesting tricks as follows:

1. When any addition, subtraction or other operation detailed above is performed, the owner of the endless band may not only show his audience that the answer can always be found on the band (after dropping the last three digits and any first surplus digit, if there is one), but he can also determine (and "guess") the answer by looking at the band or a duplicate after being given just the first three digits, even though he is not told what digits were initially chosen or what arithmetic operations were performed thereon.

2. The endless band may be held up flat and taut so that one half of it will face the owner and the other half the audience as hereinabove described. When anybody in the audience calls out any three consecutive digits from the side facing the audience, the owner can call out to the audience any number of digits following the three digits called out by the audience, by locating the digits on the side facing him corresponding to those called out by the audience, because he knows that the sum of all corresponding digits is nine and then subtracting each subsequent digit facing him from nine. The audience is not likely to discern any relationship between the two faces of the band, especially since it can be invited to fold it at any point it may choose.

While the invention has been described by reference to specific embodiments thereof, it is intended that the hereto appended claims be construed as covering not only such embodiments but all modifications and variations thereof which would be obvious to one of ordinary skill in the art to which the invention pertains.

What I claim is:

1. An educational and recreational mathematical device comprising at least one band which is endless or adapted to have ends thereof fastened to form an endless band and a plurality of individual digits imprinted on the band at regularly spaced intervals, the digits when all read consecutively clockwise as a number constituting a quotient obtained by dividing a number constituted of $(P-1)/n$ nines, in which P is a prime number greater than 5 and n is an integer at least 1, by P and adding to the lefthand end of said quotient any number of zeros necessary to increase the number of digits in said quotinet to $(P-1)/n$, n being so selected that $(P-1)/n$ nines is the minimum number of nines divisible by P so that said quotient is an integral number.

2. Device according to claim 1, in which said band is endless.

3. Device according to claim 1, in which said band comprises an article of apparel.

4. Device according to claim 3, in which said band is part of a hat or cap.

5. Device according to claim 1 in which said band is an article of jewelry.

* * * * *